Feb. 21, 1967  M. A. CHRISTENSON  3,305,202
EXTERNAL HOOD-MOUNTED REAR VIEW MIRRORS FOR AUTOMOBILES
Filed July 30, 1963
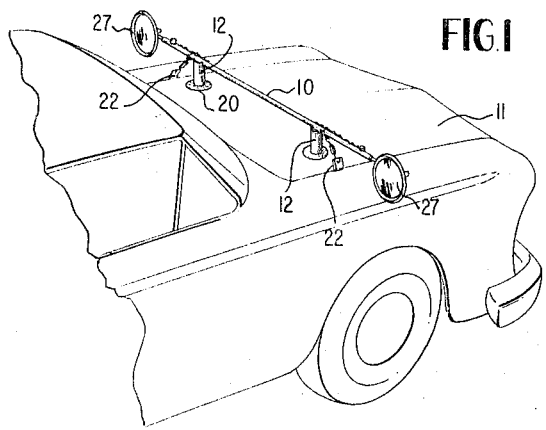
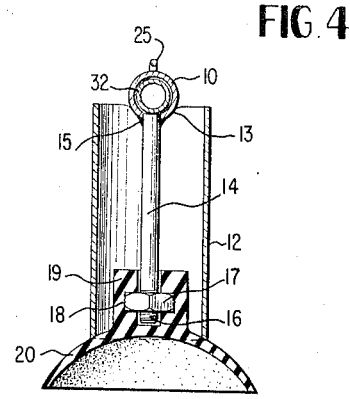
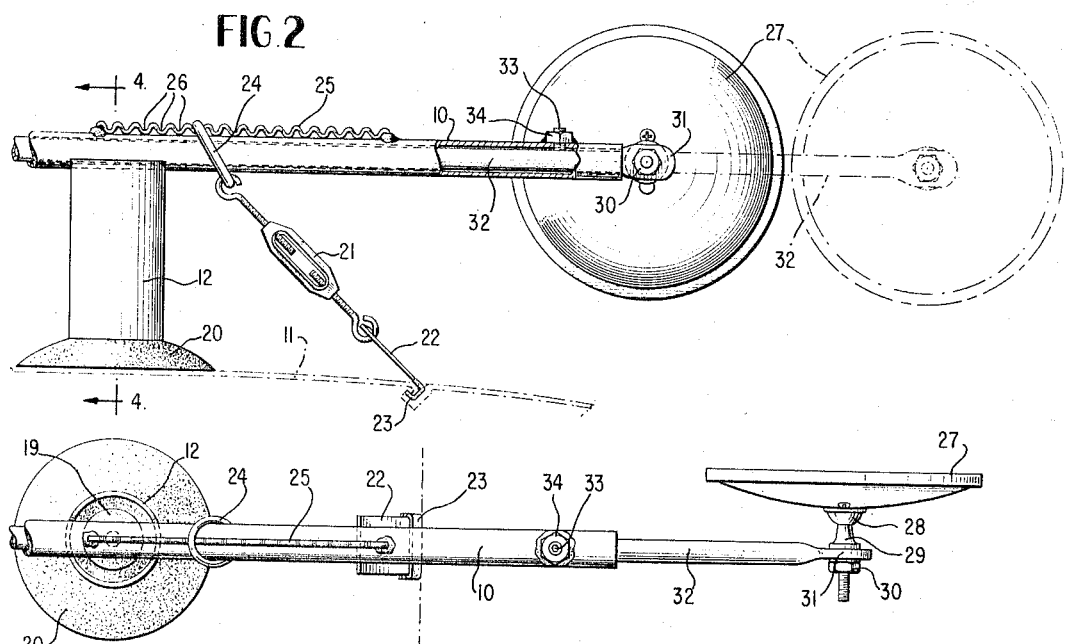
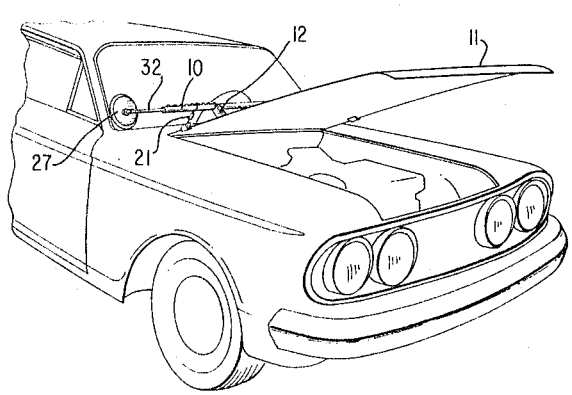
INVENTOR.
MELVIN A. CHRISTENSON
BY
B. P. Fishburn, Jr.
ATTORNEY

United States Patent Office 3,305,202
Patented Feb. 21, 1967

3,305,202
EXTERNAL HOOD-MOUNTED REAR VIEW
MIRRORS FOR AUTOMOBILES
Melvin A. Christenson, 7 N. 40th Ave.,
Yakima, Wash. 98901
Filed July 30, 1963, Ser. No. 298,631
4 Claims. (Cl. 248—201)

This invention relates to improvements in rear view mirrors for automotive vehicles.

More particularly, the invention is concerned with an adjustable rear view mirror mounting arranged exteriorly of the passenger compartment and mounted bodily upon the vertically swingable hood which covers the engine, and in such manner that the mirror mounting does not interfere with the normal opening and closing of the hood for servicing the engine.

Another object of the invention is to provide a dual rear view mirror mounting means including a pair of rear view mirrors, each of which is independently adjustable laterally of the vehicle, the invention being particularly useful on automobiles which are towing trailers or in which visibility through the rear window of the automobile is temporarily blocked by luggage or the like.

A further object of the invention is to provide novel and simplified means for detachably securing the invention device to the movable hood of the automobile.

Another object is to provide a device of the mentioned character which is simplified in construction, compact, rugged and durable, and inexpensive to manufacture and very easy to install upon or remove from the automobile.

Still another object is to provide an outside dual adjustable rear view mirror mount which employs no screws and eliminates the necessity for drilling holes in the automobile body or hood and will not mar the finish of the automobile in any manner.

Other objects and advantages of the invention will be apparent during the course of the following detailed description.

In the accompanying drawings forming a part of this application and in which like numerals are employed to designate like parts throughout the same, FIGURE 1 is a perspective view of a rear view mirror device according to the invention shown mounted upon the hood of an automobile and with the hood closed, FIGURE 2 is an enlarged fragmentary side elevational view of the invention, partly in section, looking toward the rear of the automobile, FIGURE 3 is a fragmentary plan view of the invention, FIGURE 4 is an enlarged vertical section taken on line 4—4 of FIGURE 2, and FIGURE 5 is a perspective view of the invention with the hood of the automobile opened.

In the drawings, wherein for the purpose of illustration is shown a preferred embodiment of the invention, the numeral 10 designates a unitary open-ended straight cylindrical tube adapted to span the hood portion of an automobile transversely, forwardly of the windshield, as shown in FIGURE 1. As best shown in FIGURE 2, the opposite ends of the tube 10 may extend somewhat outwardly of the longitudinal edges of the automobile hood 11, but this is a variable depending upon the make and size of the automobile. In this connection, the invention is adaptable to most standard makes and models of automobiles. The tube 10 is mounted horizontally during use, as shown in the drawing.

Near and inwardly of the ends of tube 10, a pair of short vertical cylindrical tubular legs 12 support the tube a relatively slight distance above the top of the hood 11. The tops of the legs 12 are arcuately recessed at 13 to form a cradle for the lower side of the cylindrical tube and depending vertical rods 14 have their tops rigidly secured by welding at 15 within openings in the bottom side of tube 10, thus forming a firm connection between the tubes and rods 14. The lower ends of the rods 14 are screw-threaded at 16 for the reception of nuts 17, disposed within internal cavities 18 in the hub portions 19 of rubber suction cups 20. The body portions of suction cups 20 underlie the relatively large diameter tubular legs 12 and support the same firmly and yet resiliently, and the suction cups 20 serve the dual purpose of mounting and supporting the invention bodily upon the hood 11 and also absorbing shocks due to vibration. When the suction cups 20 and the nuts 17 are turned and tightened upon the rods 14, the tube 10 is drawn firmly downwardly and seated within the recesses 13 and the bottoms of the legs 12 also bear firmly upon the suction cups. The rods 14, nuts 17 and associated elements lie centrally within the tubular legs 12 and are effectively concealed from view. The construction is very sturdy and durable, shock-resistant and clean and uncluttered in appearance.

Working in conjunction with the legs 12 and suction cups 20 for securing the invention bodily to the hood 11 are turnbuckles 21 arranged near and outwardly of the legs 12 and having hooks or clips 22 swiveled to their lower ends and preferably coated or covered at their hook extremities 23 with resilient material which cannot mar the finish of the automobile. The hook extremities 23 engage the longitudinal edges of the hood 11 and are thin enough to enter the narrow space between the edge of the hood and the adjacent front fender, FIGURE 2. The tops of the turnbuckles 21 have rings 24 swiveled thereto and these rings engage adjustably over the end portions of tube 10 and over rigid longitudinally corrugated adjusting rods or wires 25, firmly secured by welding to the top side of the tube 10 adjacent the legs 12 and for some distance outwardly thereof and longitudinally of the tube. The rings 24 are selectively engageable within any of the deep corrugations 26 of the adjustment elements 25 in the manner shown in FIGURE 2, and when the turnbuckles 21 are tightened, the assembly becomes firmly locked to the side edges of the hood 11, in addition to the holding force through the suction cups 20. The turnbuckles and associated elements thus constitute a safety holding means and also allow the invention to be applied readily to hoods of various widths, as found on various makes of automobiles. Again, the construction is very simple and compact but extremely sturdy and durable and adjustable through a wide range.

The rear view mirrors 27 proper are substantially conventional and include the usual ball-type adjusting swivel 28 rendering each mirror independently universally movable relative to the support. The supporting stem 29 of each mirror is firmly clamped by a nut 30 and washer to a flattened end 31 of an elongated straight rod 32 which engages telescopically and slidably within the adjacent end portion of tube 10. The rod 32 is of sufficient length to allow substantial adjustment of each mirror inwardly and outwardly relative to the adjacent side of the vehicle and two adjusted positions of one mirror 27 are illustrated in solid and broken lines in FIGURE 2 by way of example. In order to releasably lock each rod 32 in selected adjusted positions upon the tube 10, the latter is provided near its ends with set screws 33 engaging within nuts 34, welded to the outside of the tube 10, as shown. The inner ends of these set screws bear upon the rods 32 to firmly and yet releasably lock the same relative to the tube. Through this means, each mirror 27 is independently bodily adjustable lengthwise of the tube 10 and transversely of the automobile.

FIGURE 5 of the drawings depicts how the hood 11 may be elevated at any time for servicing the engine without interference from the invention, and the entire invention simply moves with the hood because it is bodily mounted thereon and no other part of the automobile is engaged by the invention.

The use of the invention, while driving the automobile in order to secure a clear view of the road behind the automobile and on both sides thereof, is well known and need not be described in further detail.

It is a very simple matter to install the invention upon the automobile or to remove it therefrom and there is no necessity or likelihood of scratching or marring the automobile finish when the invention is properly handled. When removed, the invention constitutes a slender assembly which may be readily stored out of the way in a closet or the like and there are no parts to become accidentally separated or lost during storage.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A rear view mirror device for automobiles comprising an elongated unitary open-ended tube to span the hood portion of an automobile transversely, forwardly of the windshield, a pair of relatively short tubular legs underlying said tube near and inwardly of the opposite ends of the tube and having cradle recesses in their tops for receiving and stabilizing the tube, rod elements rigid with the tube and depending therefrom and extending inside of the tubular legs, suction cups underlying the bottoms of the legs and engageable directly with the automobile hood and having hub portions extending within the tubular legs, nuts within said hub portions and having adjustable screw-threaded engagement with said depending rod elements and operable to clampingly secure said tube and said suction cups against the ends of the legs, adjustable turnbuckle means on said tube outwardly of said legs and suction cups and engageable with the longitudinal edges of the hood, and a pair of rear view mirrors telescopically adjustably connected with the opposite end portions of said tube and adapted to be releasably locked independently in selected adjusted positions longitudinally of said tube and transversely of the automobile.

2. The invention as defined by claim 1, and wherein each rear view mirror comprises an adjustable mirror body portion, a rod carrying said body portion and telescopingly engaging within one end of said tube, and a set screw on each end of said tube and engageable with said rod.

3. The invention as defined by claim 1, and wherein said turnbuckle means comprises an adjustable turnbuckle, a clip element on one end of the turnbuckle engageable with one edge of said hood, a ring element on the other end of said turnbuckle engageable over one end of said tube, and an elongated corrugated element secured rigidly to the exterior of said tube longitudinally thereof near said turnbuckle and receiving said ring element selectively in the several corrugations thereof.

4. The invention as defined by claim 1, and wherein said tubular legs are relatively large diameter legs considerably larger than the diameter of said tube and said suction cups extend radially outwardly of said legs for substantial distances, said hub portions of the suction cups within said legs having internal cavities receiving said nuts so that the latter may be turned with the suction cups for drawing the suction cups and said tube against the opposite ends of said large diameter legs.

No references cited.

JEWELL H. PEDERSEN, *Primary Examiner.*

W. L. SIKES, *Assistant Examiner.*